United States Patent
Chen et al.

(10) Patent No.: US 11,023,397 B2
(45) Date of Patent: Jun. 1, 2021

(54) SYSTEM AND METHOD FOR MONITORING PER VIRTUAL MACHINE I/O

(71) Applicant: ALIBABA GROUP HOLDING LIMITED, Grand Cayman (KY)

(72) Inventors: Jian Chen, San Mateo, CA (US); Li Zhao, San Mateo, CA (US); Ying Zhang, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/364,119

(22) Filed: Mar. 25, 2019

(65) Prior Publication Data
US 2020/0310997 A1  Oct. 1, 2020

(51) Int. Cl.
*G06F 13/20* (2006.01)
*G06F 9/455* (2018.01)
*G06F 13/42* (2006.01)

(52) U.S. Cl.
CPC .......... *G06F 13/20* (2013.01); *G06F 9/45558* (2013.01); *G06F 13/4221* (2013.01); *G06F 2213/0024* (2013.01)

(58) Field of Classification Search
CPC ... G06F 13/20; G06F 13/4221; G06F 9/45558
See application file for complete search history.

(56) References Cited

U.S. PATENT DOCUMENTS

| | | | | |
|---|---|---|---|---|
| 5,619,702 A * | 4/1997 | Ilic | .......... | G06F 8/447 717/151 |
| 8,707,011 B1 * | 4/2014 | Glasco | ............ | G06F 12/1027 711/118 |
| 10,146,545 B2 * | 12/2018 | Segelken | ............ | G06F 9/30174 |
| 2002/0169938 A1 * | 11/2002 | Scott | .................. | G06F 12/1072 711/207 |
| 2004/0123084 A1 * | 6/2004 | DeWitt, Jr. | ............. | G06F 9/325 712/227 |

(Continued)

OTHER PUBLICATIONS

Abramson et al. "Intel Virtualization Technology for Directed I/O.", Intel Technology Journal, Aug. 2006, vol. 10 Issue 3, pp. 179-192.

(Continued)

*Primary Examiner* — Henry Tsai
*Assistant Examiner* — Christopher A Daley
(74) *Attorney, Agent, or Firm* — Finnegan, Henderson, Farabow, Garrett & Dunner, LLP

(57) ABSTRACT

The present disclosure provides a system for monitoring I/O traffic. The system includes a memory storing information, a device, and a translation lookaside buffer (TLB). The device is configured to send a request for accessing information from the memory. The TLB includes a counter register file having counter registers, and entries having corresponding counter ID fields. The TLB is configured to receive a source identifier of the device and a virtual address associated with the request from the device, select an entry of the entries using the source identifier and the virtual address, select a counter register from the counter registers in accordance with information stored in the counter ID field of the selected entry, and update a value of the selected counter register in accordance with data transferred in association with the request.

20 Claims, 6 Drawing Sheets

(56) References Cited

U.S. PATENT DOCUMENTS

| | | | |
|---|---|---|---|
| 2005/0044340 A1* | 2/2005 | Sheets | G06F 12/1036 |
| | | | 711/206 |
| 2011/0072234 A1 | 3/2011 | Chinya et al. | |
| 2013/0080735 A1 | 3/2013 | Kimura | |
| 2014/0068137 A1* | 3/2014 | Kegel | G06F 12/109 |
| | | | 711/6 |
| 2016/0048454 A1* | 2/2016 | Ahmad | G06F 12/1027 |
| | | | 711/207 |
| 2016/0314067 A1 | 10/2016 | Medovich et al. | |
| 2017/0277639 A1 | 9/2017 | Awad et al. | |
| 2017/0371743 A1* | 12/2017 | Kalamatianos | G06F 11/1064 |
| 2018/0157437 A1* | 6/2018 | Sandberg | G06F 3/0647 |
| 2019/0163644 A1* | 5/2019 | Jayasena | G06F 12/128 |
| 2019/0272104 A1* | 9/2019 | Durnov | G06F 3/0604 |

OTHER PUBLICATIONS

"Intel Virtualization Technology for Directed I/O-Architecture Specification, Rev 3.0", downloaded at https://software.intel.com/sites/default/files/managed/c5/15/vt-directed-io-spec.pdf, 285 pages, Jun. 2019.

International Seach Report in related International Application No. PCT/CN2020/079435, dated Jun. 16, 2020 (8 pgs).

* cited by examiner

SYSTEM AND METHOD FOR MONITORING PER VIRTUAL MACHINE I/O

BACKGROUND

In I/O virtualization technology, PCI pass-through or single root input/output virtualization (SR-IOV) are increasingly applied in the cloud computing as well as in the client computing. By directly assigning I/O devices to Virtual Machines (VM), the hypervisor is bypassed. Therefore, such types of I/O virtualization can deliver near-native I/O performance.

However, known software-based approaches carry out I/O traffic accounting by the hypervisor that I/O transaction goes through. For directed I/O, since the hypervisor does not involve in I/O transaction except for the initial setup, the I/O traffic is not monitored by the hypervisor. The lack of I/O traffic information may cause obstacles on various applications and may result in difficulties with managing virtual machines in a cloud computing system.

SUMMARY

The present disclosure provides a system for monitoring I/O traffic. The system includes a memory configured to store information, a device, and a translation lookaside buffer (TLB). The device is configured to send a request for accessing information from the memory. The TLB includes a counter register file having counter registers, and entries having corresponding counter ID fields. The TLB is configured to receive a source identifier of the device and a virtual address associated with the request from the device, select an entry of the plurality of entries using the source identifier and the virtual address, select a counter register from the plurality of counter registers in accordance with information stored in the counter ID field of the selected entry, and update a value of the selected counter register in accordance with data transferred in association with the request.

The present disclosure provides a method for monitoring I/O traffic. The method includes: receiving, from a device, a source identifier of the device and a virtual address associated with a request for accessing information from a memory; selecting an entry of a plurality of TLB entries in accordance with the source identifier and the virtual address; selecting a counter register from a plurality of counter registers in accordance with a counter ID stored in a counter ID field of the selected entry; and updating a value of the selected counter register in accordance with size of data accessed in association with the request.

The present disclosure provides a system for monitoring I/O traffic. The system includes a memory configured to store information and a mapping table, a translation lookaside buffer (TLB) including a counter register file, and a processor. The counter register file having counter registers exposed as memory-mapped I/O registers, in which a counter register of the counter registers is selected to update a value of the selected counter register in accordance with data transferred between the memory and a device. The processor is configured to set the counter registers to a read mode during an interrupt, read out the counter registers using corresponding counter IDs obtained from the mapping table, and store the values of the counter registers in the memory.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Embodiments of the present disclosure mitigate the problems stated above by providing systems and methods for monitoring per virtual machine (per-VM) I/O traffic using hardware counters. An I/O counter register file located in a centralized Input/Output translation lookaside buffer (IOTLB) or a local device-TLB, and an associated field in IOTLB entries are introduced to record the I/O traffic. In addition, a mapping table is introduced to a virtual machine monitor (VMM) for the VMM to keep track of the mapping relationship between virtual machines, counter registers, and I/O devices. Furthermore, I/O counter registers can be accessed and read out to present the per-VM I/O traffic results by a mechanism compatible with the existing performance counter architecture in the embodiments of the present disclosure.

Accordingly, shortcomings of the direct I/O technology can be overcome by embodiments of the present disclosure. With the structures and the methods disclosed in various embodiments, per-VM I/O traffic can be monitored in VMM with the support of hardware counters. Thus, various applications, including power modeling or capping, I/O QoS or prioritization, can benefit from the monitored I/O traffic information.

Figure 1:
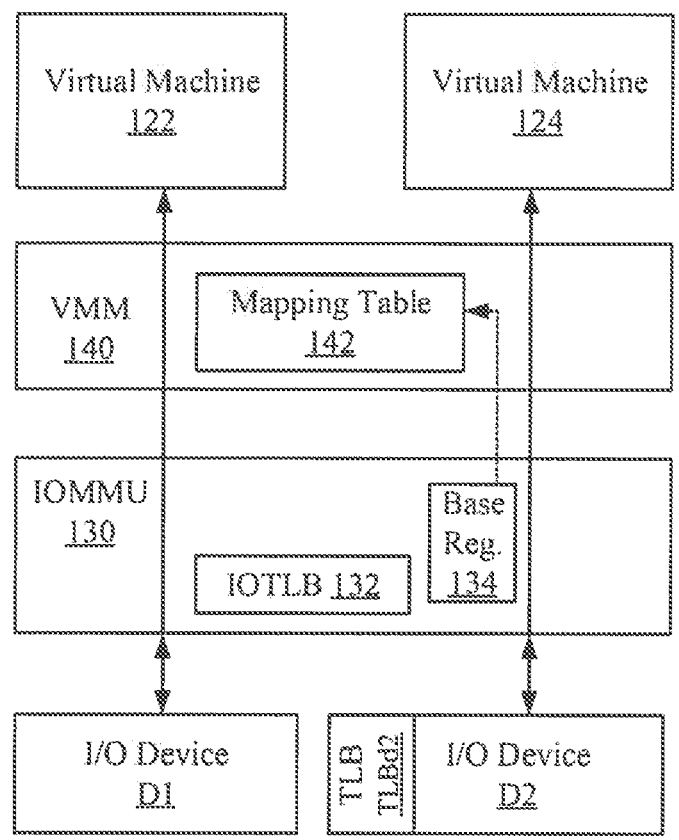
FIG. 1 is a schematic diagram illustrating an exemplary I/O virtualization framework for virtual machines, consistent with embodiments of the present disclosure.

Reference is made to FIG. 1, which is a schematic diagram illustrating an exemplary I/O virtualization framework 100 for virtual machines, consistent with embodiments of the present disclosure. In general, a virtual machine (VM) in the document may refer to an emulated computer system, which is created using software and provides similar functionality to a physical machine. For instance, a system virtual machine provides functionality required to execute an operating system (OS). Virtual machines can use physical system resources, such as the CPU, RAM, and disk storage, but are isolated from other software. Multiple VMs isolated from one another, also known as "guests" or virtualized instances, can exist on the same physical machine and interact with the hardware under the control of the software, known as a "hypervisor," or a virtual machine monitor (VMM). The hypervisor manages one or more VMs and uses native execution to share and manage the hardware. It is appreciated that the hypervisor can be a type-1 or type-2 hypervisor, where a type-1 hypervisor runs directly on the system hardware to control the hardware and manage guest operating systems; and a type-2 hypervisor runs on the host operating system that provides virtualization service to a guest operating system.

As shown in the figure, in I/O virtualization framework 100, two input/output devices (I/O devices) D1 and D2 are attached to an input-output memory management unit (IOMMU) 130 and are respectively assigned to VMs 122 and 124. IOMMU 130 is a memory management unit that connects a direct-memory-access-capable I/O bus to a main memory of the physical machine. Direct Memory Access (DMA) is a feature of computer systems that allows certain hardware subsystems to access the main memory independent of the central processing unit (CPU). IOMMU 130 is configured to perform the DMA remapping and translate the addresses in DMA requests issued by the I/O devices D1, D2 to corresponding host physical addresses. That is, IOMMU 130 can map device-visible virtual addresses to host physical addresses.

In this DMA remapping process, a translation lookaside buffer (TLB) 132 located in the IOMMU 130 can be used to cache the frequently used address translation mappings to avoid time-consuming page-walks. The translation lookaside buffer (TLB) 132 in the IOMMU 130 is also called an input/output translation lookaside buffer (IOTLB). As shown in FIG. 1, some I/O devices (e.g., I/O device D1) do not contain a local TLB, while some other I/O devices (e.g., I/O device D2) may have its own local TLB TLBd2 to accelerate DMA remapping and reduce the capacity pressure on the IOTLB 132 in the IOMMU 130 when the system 200 has a large number of I/O devices. The local TLBs contained in the I/O devices are also called device TLBs to distinguish from the IOTLB 132 in the IOMMU 130.

The hardware support for DMA remapping mentioned above enables the direct device assignment without device-specific knowledge in the virtual machine monitor (VMM) 140. Accordingly, through direct assignment of I/O devices D1 and D2 to VMs 122 and 124, such as PCI passthrough or SR-IOV, a driver for an assigned I/O device can run in the virtual machine (VM) assigned and is able to interact directly with the hardware of the device with minimal or no VMM involvement.

For example, PCI Express SR-IOV capability enables a "physical function" on an endpoint device to support multiple "virtual functions" (VFs). The physical function is a fully featured PCIe function that can be discovered, managed, and manipulated like any other PCIe device and can be used to configure and control a PCIe device. Virtual functions are lightweight PCIe functions that share one or more physical resources with the physical function and with virtual functions that are associated with the physical function. Unlike the physical function, one virtual function configures its own behavior. Each SR-IOV device can have a physical function, and each physical function can have multiple virtual functions associated with the physical function. When SR-IOV is enabled, virtual functions associated with the physical function are under the scope of the same remapping unit as the physical function.

In some embodiments of the present disclosure, a mapping table 142 is stored in the memory space assigned to VMM 140, and different parts of the mapping table 142 are respectively referenced by base registers 134 in the IOMMU 130. Details and functions associated with the mapping table 142 will be discussed later for better understanding of the embodiments.

Figure 2:
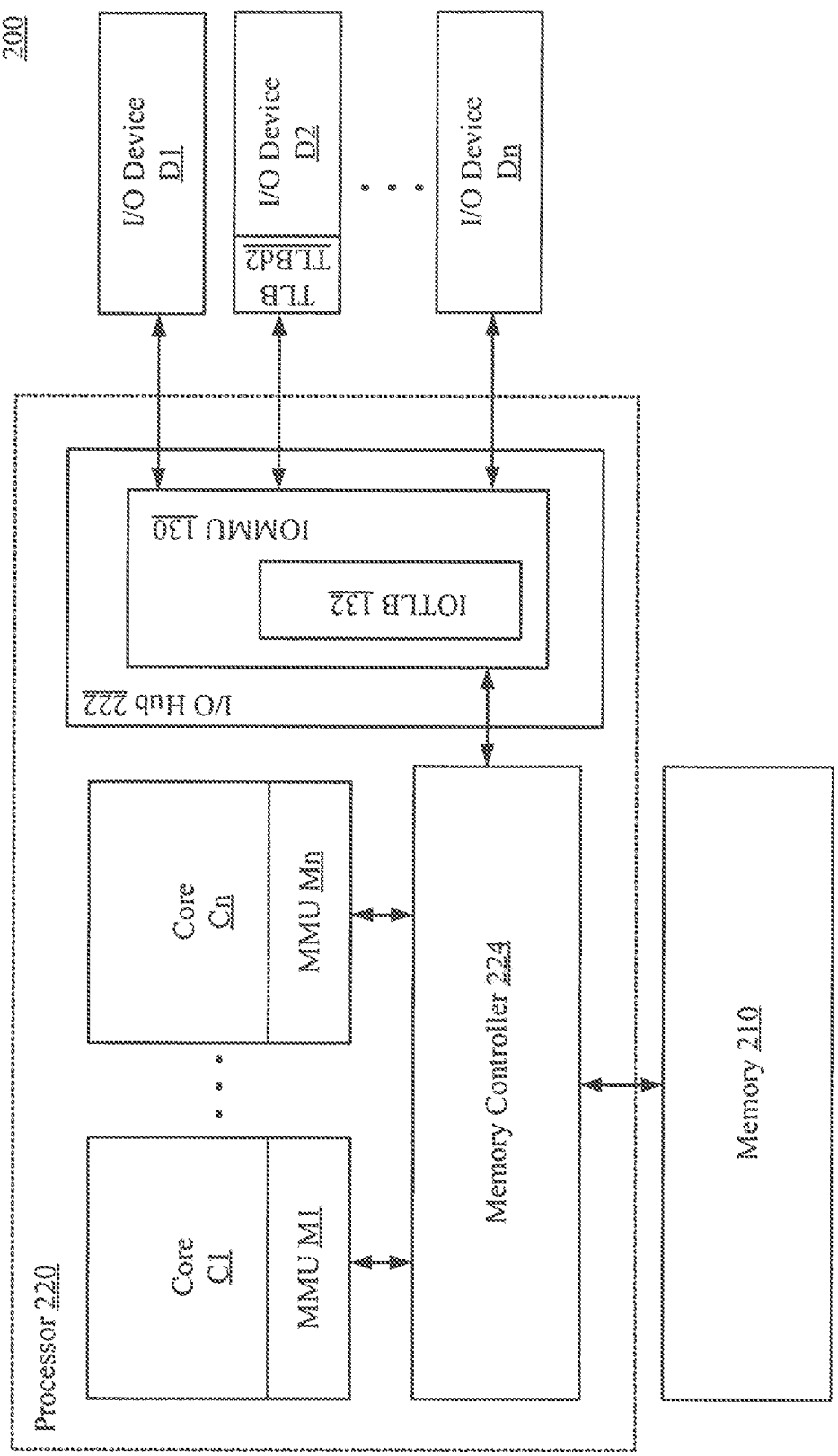
FIG. 2 is a schematic diagram illustrating an exemplary system, consistent with embodiments of the present disclosure.

Reference is made to FIG. 2, which is a schematic diagram illustrating an exemplary system 200, consistent with embodiments of the present disclosure. As shown in FIG. 2, system 200 includes I/O devices D1, D2-Dn, a memory 210 (e.g., a main memory) storing information, and a processor 220. The processor 220 includes an I/O hub 222, a memory controller 224 and multiple cores C0-Cn. The cores C0-Cn respectively include corresponding memory management unit (MMU) M1-Mn for translating virtual address of memory accesses to the physical address before reaching the memory controller 224 integrated in the processor 220. I/O devices D1, D2-Dn are connected to the processor 220 via the I/O hub 222, which contains the IOMMU 130 described in FIG. 1. In the embodiments shown in FIG. 2, the I/O hub 222 is integrated in the processor 220, but the present disclosure is not limited thereto. In some other embodiments, the I/O hub 222 can also be in a separate chip (e.g., a north bridge chip).

Accordingly, the memory controller 224 and the I/O devices D1, D2-Dn are both connected to IOMMU 130, and thus the I/O devices D1, D2-Dn can be configured to send a request for accessing information from the memory 210 via the IOMMU 130 and the memory controller 224. When the request is sent by any one of the I/O devices D1, D2-Dn, the IOTLB 132 in the IOMMU 130 is configured to receive request information associated with the request. For example, the request information may include a source identifier of the I/O device and a virtual address that is seen by the I/O device sending the request. In some embodiments, the source identifier specifies a virtual function associated with the I/O device sending the request.

Responsive to the source identifier and the virtual address, the IOMMU 130 performs the DMA remapping to obtain the corresponding host physical address and communicates with the memory controller 224, so that the I/O device can access the requested information from the memory 210.

In some embodiments, the system 200 can achieve I/O traffic monitoring and accounting for the VMs in directed I/O by using hardware counters in the IOTLB 132 or in the device TLB TLBd2, and enable per-VM I/O performance monitoring, per-VM power modeling and planning accordingly.

Figure 3:
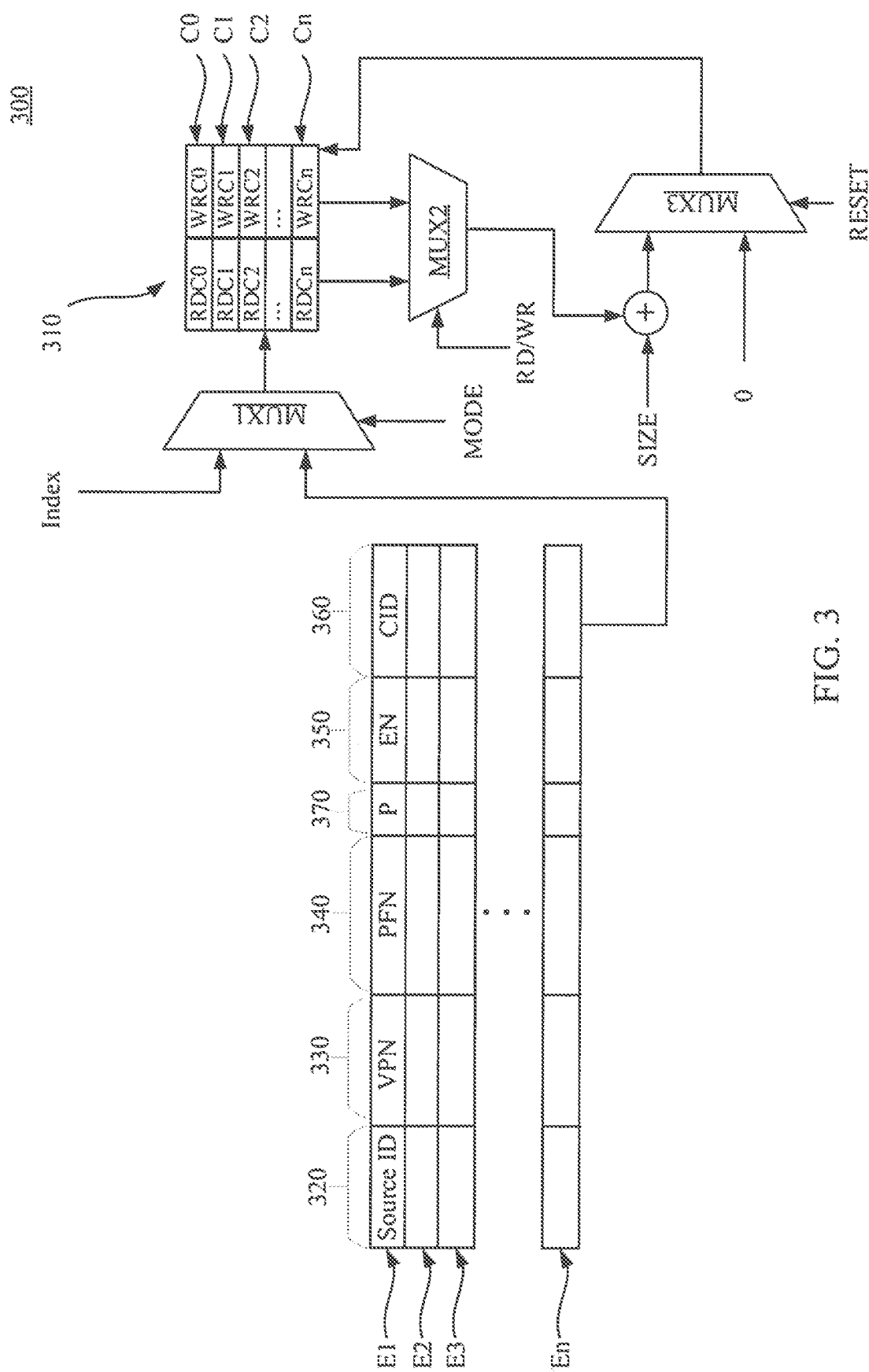
FIG. 3 is a schematic diagram illustrating the structure of an exemplary TLB, consistent with embodiments of the present disclosure.

Reference is made to FIG. 3, which is a schematic diagram illustrating the structure of an exemplary TLB 300, consistent with embodiments of the present disclosure. The TLB 300 may be the IOTLB in the IOMMU, or the local TLBs in the I/O devices. As shown in FIG. 3, TLB 300 includes a counter register file 310 and multiple TLB entries E1-En. The counter register file 310 includes counter registers C0-Cn, which may be implemented by a set of special-purpose registers built into a microprocessor to store the counts of hardware-related activities within the system 200.

A TLB entry contains a source ID field 320 holding the DMA requester or source-id of the I/O device, a virtual address field 330 storing a Virtual Page Number (VPN), a corresponding physical address field 340 storing a Physical Frame Number (PFN), a counter enable bit 350, and a counter ID (CID) field 360 for indexing the counter register file 310. In the virtualized environment, VPN may refer to guest-physical address page number, and PFN may refer to host-physical frame number. In some cases, two different VMs may assign the same guest-physical address space to their virtual devices respectively. The source ID field 320 can be configured to store the source-id of the I/O device to differentiate same VPNs coming from different I/O devices and directing to different PFNs.

In various embodiments, TLB entries may also contain additional fields for other miscellaneous purposes, such as permission control, validity and dirtiness, etc. For example, TLB entries E1-En in FIG. 3 further contain a permission control field 370, but the present disclosure is not limited thereto.

When an I/O device requests a DMA access, the virtual address along with the source identifier (e.g., source-id) of the I/O device is sent to the TLB 300. The TLB 300 is configured to perform an associative search and select an entry of the entries E1-En using the source identifier and the virtual address. That is, if the source ID field 320 and the virtual address field 330 of an entry matches the source identifier and the virtual address, there is a "hit" in the TLB 300, and the TLB 300 selects the entry. Responsive to the hit, the TLB 300 is configured to return the page frame number (PFN) stored in the physical address field 340 of the selected entry for accessing the memory 210 and transferring data between the I/O device and the memory 210 associated with the request.

In addition, the TLB 300 is configured to check whether the counter enable bit 350 of the selected entry is activated. The counter enable bit 350 is configured to indicate whether the corresponding register is enabled to count. If the counter enable bit 350 is activated, the TLB 300 uses a counter ID stored in the CID field 360 of the selected entry to index into the counter register file 310. Alternatively stated, the TLB 300 is configured to select a register from the counter registers C0-Cn in accordance with information stored in the CID field 360 of the selected entry and update a value of the selected register C0-Cn in accordance with data transferred based on the request. Accordingly, the I/O traffic accounting is completed for this request.

In detail, the value stored in the selected register C0-Cn is increased by a size of data transferred between the I/O device and the memory 210 associated with the request in response to the counter enable bit 350 of the selected entry being activated. As shown in FIG. 3, the counter registers C0-Cn respectively have sub-registers RDC0-RDCn as the read counters, and sub-registers WRC0-WRCn as the write counters. In some embodiments, the sub-registers RDC0-RDCn and WRC0-WRCn are registers with a width of 64 bits, but the present disclosure is not limited thereto.

In some embodiments, a read operation refers to send data from the I/O device to the memory 210, and a write operation refers to retrieve data from the memory 210 to the I/O device. Base on read or write operations between the I/O device and the memory 210, a RD/WR signal is sent to the multiplexer MUX2 to select the read counter or the write counter in the corresponding one of the counter registers C0-Cn. The selected counter is incremented by the access size (e.g., SIZE) in the following cycle. Thus, the number of I/O bytes in the traffic is tracked, and the value stored in the corresponding sub-register (e.g., one of the sub-registers RDC0-RDCn of the selected registers C0-Cn) is increased by the size of data sent to the memory 210 from the I/O device (e.g., I/O device D1). Similarly, the value stored in the corresponding sub-register (e.g., one of the sub-registers WRC0-WRCn of the selected registers C0-Cn) is increased by the size of data retrieved from the memory 210 to the I/O device (e.g., I/O device D1). Therefore, by the above operations, the sub-registers RDC0-RDCn, WRC0-WRCn in the counter registers C0-Cn can store the corresponding I/O traffic of the memory access associated with different I/O devices and different virtual functions.

In some embodiments, the counter registers C0-Cn are exposed via PCIe Base Address Registers (BAR) as memory-mapped I/O registers. These registers can be integrated with the existing sampling-based Performance Counter Monitoring framework. The counter registers C0-Cn can be set to a READ mode by providing a corresponding mode signal MODE to the multiplexer MUX1, so as to read out the register value using memory read instructions. The method to read out the I/O counter register file 310 will be discussed later in accompanying with the figure.

In addition, the counter registers C0-Cn can be reset by the multiplexer MUX3 when receiving a reset signal RESET. By resetting the counter register file 310, counter multiplexing can be achieved to reuse the counter registers in different time intervals to track different activities, which will also be discussed later in accompanying with the figure.

If there is a "hit" in the TLB 300, but the counter enable bit 350 in the selected entry is inactivated, the TLB 300 may still return the page frame number (PFN) stored in the physical address field 340 of the selected entry for memory access, without updating the corresponding counter register C0-Cn in the counter register file 310. Thus, I/O traffic accounting may not be carried out for the memory access associated with this DMA request.

If the TLB 300 cannot find a matching entry in the TLB entries E1-En, the IOMMU 130 is configured to perform a page-table walk to obtain the PFN for accessing the memory 210 in response to the determination that the request is unmatched to the TLB entries E1-En. By the page-table walk, the virtual address in the request information is translated to the physical address of the memory 210 where that data is stored.

In addition, the IOMMU 130 also uses the base registers 134 to locate the mapping table 142 in the memory 210 when the request is unmatched to the TLB entries E1-En. For example, FIG. 4 a schematic diagram illustrating the structure of an exemplary mapping table 400, consistent with embodiments of the present disclosure. As shown in the figure, the mapping table 400 includes a CID table 410 and a VMID table 420 indexed by the counter ID (designated as CID in FIG. 4). The CID table 410 is configured to store mapping information between the counter IDs and the source identifiers. The VMID table 420 is configured to store mapping information between VMs and counter IDs. Thus, mapping entries in the mapping table 400 store information to hold the mapping between the VMs, the counter IDs, and the source identifiers.

The CID table 410 and the VMID table 420 are both stored in the memory space assigned to VMM 140 and may be referenced by the base register 0 and the base register 1 in the IOMMU 130 respectively. During an initial virtual machine setup stage, the VMM 140 is configured to generate corresponding counter IDs for source identifiers indicating different I/O devices and functions, and to populate the CID table entries in the CID table 410. The VMM 140 is also configured to assign VM identifiers (e.g., VMID0-VMIDn) for the virtual machines, and to put the VM identifiers in the corresponding VMID entries in the VMID table 420.

Figure 4:
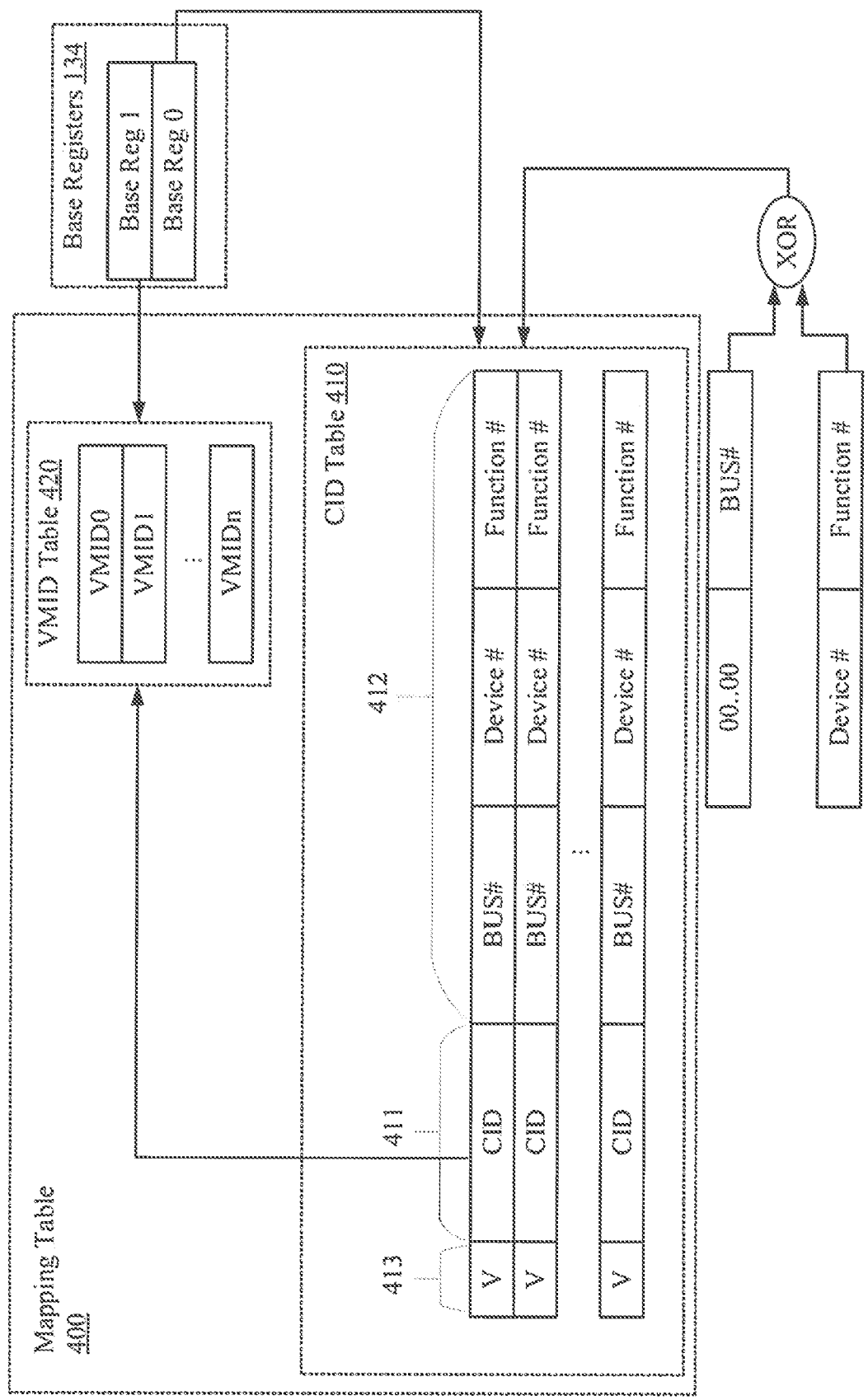
FIG. 4 is a schematic diagram illustrating the structure of an exemplary mapping table, consistent with embodiments of the present disclosure.

A CID table entry in the CID table 410 includes a counter ID field 411 to store the counter ID, a source identifier field 412, and a valid bit 413. In some embodiments, the source identifier field 412 include multiple fields to respectively store a PCIe bus number, a device number, and a virtual function number, as shown in FIG. 4. The number of the entries of the CID table 410 corresponds to the number of entries of the counter register file 310, and is determined by the width of the counter ID field 411. In various embodiments, the width of counter ID field 411 may be different in accordance with different designs or hardware budgets. For example, in some embodiments, the counter ID is 10-bit long, hence there are 1024 entries in the CID table 410 can be used for I/O traffic counting, but the present disclosure is not limited thereto. In different embodiments, the width of counter ID field 411 can also be shorter or longer than 10-bit for systems depending on the number of active PCIe devices or virtual functions.

The system 200 can hash part of or the entire source identifier associated with the request to index the CID table 410. For example, the function number may be 3-bit long for I/O devices without SR-IOV support and may be 8-bit long for I/O devices with SR-IOV. For the SR-IOV case, the system 200 performs an exclusive-or (XOR) operation between bus number and functional number and concatenates the output with the least significant bits (LSBs) of the device number. In some cases, two different source identifiers may direct to the same CID table entry. That is, collisions may occur in the CID table 410. This issue can be solved by counter multiplexing, which offers efficiency in memory capacity requirement and flexibility in hardware designs and will be addressed in later paragraphs.

As mentioned above in FIG. 1, in response to the determination that the request is unmatched to the TLB entries E1-En, the IOMMU 130 locates the mapping table 142 by the base registers 134. Accordingly, in FIG. 4, the TLB 300 accesses the mapping table 400 to select a mapping entry from the mapping entries in accordance with the request and to replace the physical address field 340 and the CID field 360 in a TLB entry with the PFN obtained by the page-table walk and information (e.g., the counter ID value) stored in the selected mapping entry respectively.

For example, the IOMMU 130 may use the hashed source identifier associated with the request to find if there is a match in the CID table entries. If the source identifier field 412 in a CID table entry matches the source identifier of the request, the IOMMU 130 selects the CID table entry and further checks whether the valid bit 413 in the selected CID table entry is activated. If the valid bit in the selected CID table entry is activated, the IOMMU 130 is configured to correspondingly activate the counter enable bit 350 of the selected TLB entry. Responsive to the activated counter enable bit 350, the CID value stored in the counter ID field 411 of the selected CID table entry can concatenate with the PFN returned from the page-table walk and can replace one of the TLB entries in the TLB 300. In addition, the counter ID field 411 in the selected CID table entry is also used to index into the counter register file 310 and to increase the value stored in the corresponding register with the access size. This increment operation is similar to the increment operation discussed above, and thus further explanation is omitted herein for the sake for brevity. On the other hand, if the valid bit in the selected CID table entry is inactivated, the IOMMU 130 is configured to call the VMM 140 to update the counter ID field 411 in the selected CID table entry. In detail, the IOMMU 130 raises an exception and communicates with the VMM 140, so that VMM 140 takes over and updates the selected CID table entry with an appropriate CID value.

If the source identifier field 412 in the selected CID table entry is unmatched to the source identifier in the request information, a hashing collision occurs, which indicates two source identifiers associated with different requests direct to the same CID table entry. In this case, the counter ID field 411 in the selected CID table entry will also concatenate with the PFN returned from the page-table walk and replace one of the TLB entries in the TLB 300, but the IOMMU 130 is configured to inactivate the counter enable bit 350 of the selected TLB entry. Accordingly, the access request is not counted in the corresponding one of the counter registers C0-Cn in the counter register file 310 in a wrong way, since the corresponding register is currently used to monitor I/O traffic for other devices or functions.

In the embodiments where the system 200 includes one or more I/O devices (e.g., I/O device D2) having its own device TLB TLBd2, the TLB TLBd2 can perform operations similar to those performed by the IOTLB 132. Alternatively stated, when the I/O device D2 requests a DMA access, the virtual address and the source identifier are sent to the device TLB TLBd2. The device TLB TLBd2 is configured to receive this request information associated with the request and to perform an associative search accordingly. Similar to the operations mentioned above, the device TLB TLBd2 is configured to select a matching entry of the device TLB entries using the source identifier and the virtual address.

Responsive to the hit, the device TLB TLBd2 is configured to return the page frame number (PFN) stored in the physical address field of the selected device TLB entry. Thus, the I/O device D2 can continue the DMA access with the corresponding PFN, without accessing the IOMMU 130.

In addition, the device TLB TLBd2 is configured to check whether the counter enable bit 350 of the selected TLB entry is activated. If the counter enable bit 350 is activated, the device TLB TLBd2 uses the counter ID stored in the CID field 360 of the selected TLB entry to index into the I/O counter register file 310. Thus, a value of the selected register can be updated in accordance with data transferred based on the request. Base on the read or write operation, the read or write counter in the selected register is incremented by the size of the access in the following cycle. Accordingly, the I/O traffic accounting is completed for this request. On the other hand, the I/O traffic accounting is not carried out for this access, and the counter register in the I/O counter register file 310 is not updated if the counter enable bit 350 of the selected TLB entry is inactivated.

On the other hand, if the device TLB TLBd2 cannot find a matching TLB entry in the TLB entries, the device TLB TLBd2 communicates with the IOMMU 130 and passes the address translation task to the IOMMU 130. For example, in some embodiments, the device TLB TLBd2 is configured to send the request to the PCIe root complex via Address Translation Service (ATS) protocol. The root complex invokes the IOMMU 130 to perform the address translation. In addition, the IOMMU 130 also identifies the corresponding CID using the same procedure as mentioned in the above paragraphs. Accordingly, the IOMMU 130 can return the translated physical address, the counter ID and the counter enable bit back to the device TLB TLBd2. Thus, the device TLB TLBd2 is able to replace the corresponding device-TLB entry with the returned information. The detail operations of the IOMMU 130 for performing page-table walk, accessing mapping table to assign the counter ID, and selectively activating or inactivating the counter enable bit are described in detail in the above paragraphs. Thus, further explanation is omitted herein for the sake of brevity.

With the updated device-TLB entry, the device TLB TLBd2 can find the hit in the device-TLB entries, and the I/O device D2 can continue the DMA access with the corresponding PFN returned from the selected device-TLB entry. Similar to the operations stated above, the device TLB TLBd2 can now continue to check whether the counter enable bit 350 of the selected TLB entry is activated, and to carry out the I/O traffic accounting in response to the asserted counter enable bit.

Figure 5:
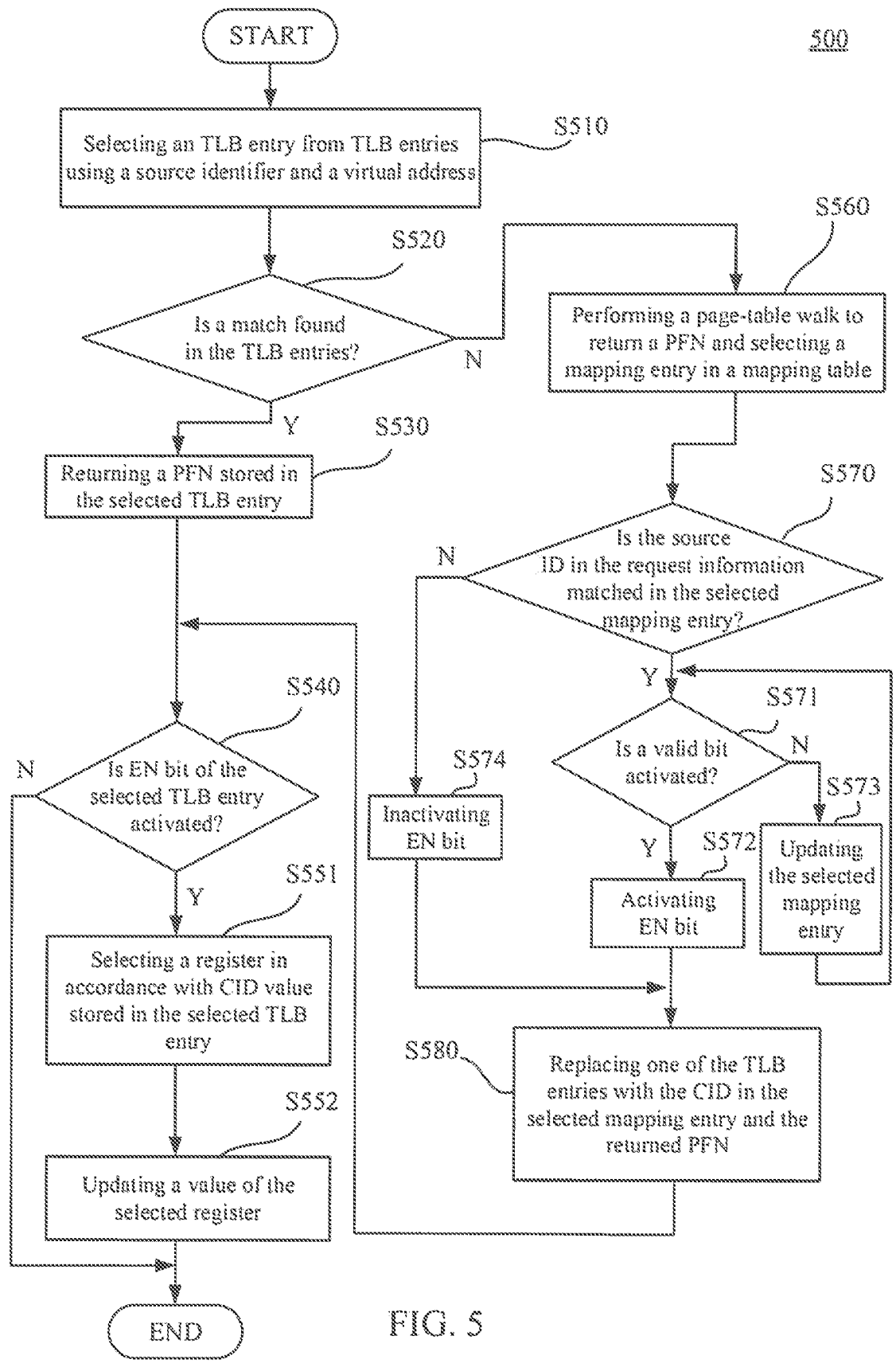
FIG. 5 illustrates a flow diagram of an exemplary method for monitoring per virtual machine (per-VM) I/O traffic, consistent with embodiments of the present disclosure.

Reference is made to FIG. 5, which illustrates a flow diagram of an exemplary method 500 for monitoring I/O traffic, consistent with embodiments of the present disclosure. Method 500 can be performed by a computer system (e.g., system 200 in FIG. 2). As shown in FIG. 5, in some embodiments, the method 500 includes steps S510-S580, which will be discussed in the following paragraphs.

In step 510, the system selects an entry from TLB entries (e.g., TLB entries E1-En in FIG. 3) using a source identifier and a virtual address. For example, the source identifier and the virtual address are request information associated with a request for accessing a memory (e.g., memory 210 in FIG. 2) from a device (e.g., I/O device D1 in FIG. 2). A translation lookaside buffer (TLB) (e.g., IOTLB 132 in FIG. 2) can receive this request information and select an entry as a matching entry if the source ID field (e.g., source ID field 320 in FIG. 3) and the virtual address field (e.g., virtual address field 330 in FIG. 3) of the entry matches the source identifier and the virtual address associated with the request.

In step 520, the system determines whether the request information matches the information in the TLB entries. That is, whether a "hit" matching the source identifier and the virtual address can be found in the TLB. Responsive to a determination that the request is matched in the TLB entries, the system performs step 530, and TLB returns a page frame number (PFN) stored in the physical address field of the selected entry for accessing the memory and transferring data between the device and the memory associated with the request. Thus, the system can perform DMA access with the returned PFN.

Next, in step S540, the system determines whether a counter enable bit (e.g., EN bit) of the selected entry is activated. In response to the counter enable bit of the selected entry being activated, the system performs steps S551 and S552. On the other hand, in response to the counter enable bit of the selected entry being inactivated, steps S551 and S552 are skipped, and the I/O traffic accounting is not carried out for this memory access associated with the request.

In step S551, the system selects a register from counter registers in the TLB in accordance with information (e.g., CID value) stored in the counter ID field of the selected entry. In detail, a counter ID stored in the selected entry is used to index into the I/O counter register file, and the system selects the read or write counter based on the corresponding read or write operation.

In step S552, the system updates a value of the selected register in accordance with data transferred based on the request. In detail, the selected read or write counter is incremented by the size of the access in the following cycle. Accordingly, the I/O traffic accounting is completed for this request by performing S551 and S552.

On the other hand, responsive to a determination that the request is unmatched in the TLB entries in step S520, step S560 is performed. In step S560, the system performs a page-table walk by the IOMMU to obtain the page frame number (PFN) for accessing the memory and the system also selects one of mapping entries in a mapping table in accordance with the request. In some embodiments, the system may perform the page-table walk and select the one of mapping entries in parallel at the same time, but the present disclosure is not limited thereto.

Next, in step S570, the system determines whether the source identifier in the request information is matched to a source identifier in a source identifier field in the selected mapping entry. Responsive to a determination that the source identifier in the request information is matched to the selected mapping entry, the system performs step S571 and determines whether a valid bit (e.g., valid bit 413 in FIG. 4) in the selected mapping entry is activated. If the valid bit in the selected mapping entry is activated, the system performs 572 and activates the counter enable bit (e.g., counter enable bit 350 in FIG. 3) of the selected TLB entry by the IOMMU.

If, however, the valid bit in the selected mapping entry is inactivated, the system performs step S573 and updates the counter ID field (e.g., counter ID field 411 in FIG. 4) in the selected mapping entry by the VMM (e.g., VMM 140 in FIG. 1), and repeats step S571 until the valid bit is set and the counter enable bit is activated. In some embodiments, the IOMMU may raise an exception and communicate with the VMM, so that VMM takes over and updates the selected CID table entry with an appropriate CID value.

On the other hand, responsive to a determination that the source identifier in the request information is unmatched to the selected mapping entry at step S570, the system performs step S574 and inactivates the counter enable bit of the selected TLB entry by the IOMMU.

After the counter enable bit of the selected TLB entry is configured to be activated or inactivated, in step S580, the system replaces the physical address field (e.g., physical address field 340 in FIG. 3) and the CID field (the CID field 360 in FIG. 3) in one of the TLB entries with the returned PFN and the CID value stored in the selected mapping entry.

After step S580, the system can perform DMA access with the PFN obtained from the page-table walk, and can perform steps S540, S551 and S552, which are described above. Thus, the IOMMU can select and update a corresponding register in the I/O counter register file using the CID value in response to the activated counter enable bit of the selected TLB entry. Similar to the above operations, in response to the inactivated counter enable bit of the selected TLB entry, the counter register will not be selected and updated, and the I/O traffic accounting will not be carried out.

It is noted that the method 500 can be applied to monitoring I/O traffic for I/O devices with or without their device-TLBs. The operations of hardware I/O traffic accounting for devices with device-TLB will be elaborated in the following paragraphs.

For the I/O device (e.g., I/O device D2 in FIG. 2) containing a device-TLB (e.g., device-TLB TLBd2 in FIG. 2), in step 510, the device-TLB in the I/O device receives request information, including the source identifier and the virtual address, and select a matching entry in the device-TLB entries. In detail, an entry is selected if the values in the source ID field and the virtual address field of the entry match the source identifier and the virtual address in the request information.

In step 520, the system determines whether the information in the request matches the information in the device-TLB entries. Responsive to a determination that there is a match in the device-TLB entries, the system performs step S530, and device-TLB returns the page frame number (PFN) stored in the physical address field of the selected device-TLB entry. Thus, without accessing the IOMMU, the system can continue the DMA access process with the returned PFN. Accordingly, the capacity pressure on the IOTLB in the IOMMU is reduced. Next, in step S540, S551 and S552, the system can perform similar operations to select and update a corresponding register in the I/O counter register file using the CID value in the selected device-TLB entry in response to the activated counter enable bit of the selected device-TLB entry. Detail explanation is discussed in above paragraphs and thus is omitted herein.

Responsive to a determination that the request information does not match information in the device-TLB entries, in step S560, since the device-TLB is not able to perform the page-table walk, the system first sends, from the device-TLB, the DMA request and associated request information to the IOMMU. Then, the page-table walk can be performed by the IOMMU to obtain the page frame number (PFN) for accessing the memory. Operations in steps S570-S574 and S580 for I/O devices having local TLBs are similar to those discussed above, while the CID value, the counter enable bit, and the returned PFN value are in the device-TLB entries in the device-TLB. On the other hand, for I/O devices without local TLBs, the CID value, the counter enable bit, and the returned PFN value mentioned in steps S570-S574 and S580 are in the IOTLB entries of the centralized IOTLB. Accordingly, the system can achieve I/O traffic accounting, no matter whether the I/O device contains its own device-TLB or not, by applying operations in the method 500 in FIG. 5.

Figure 6:
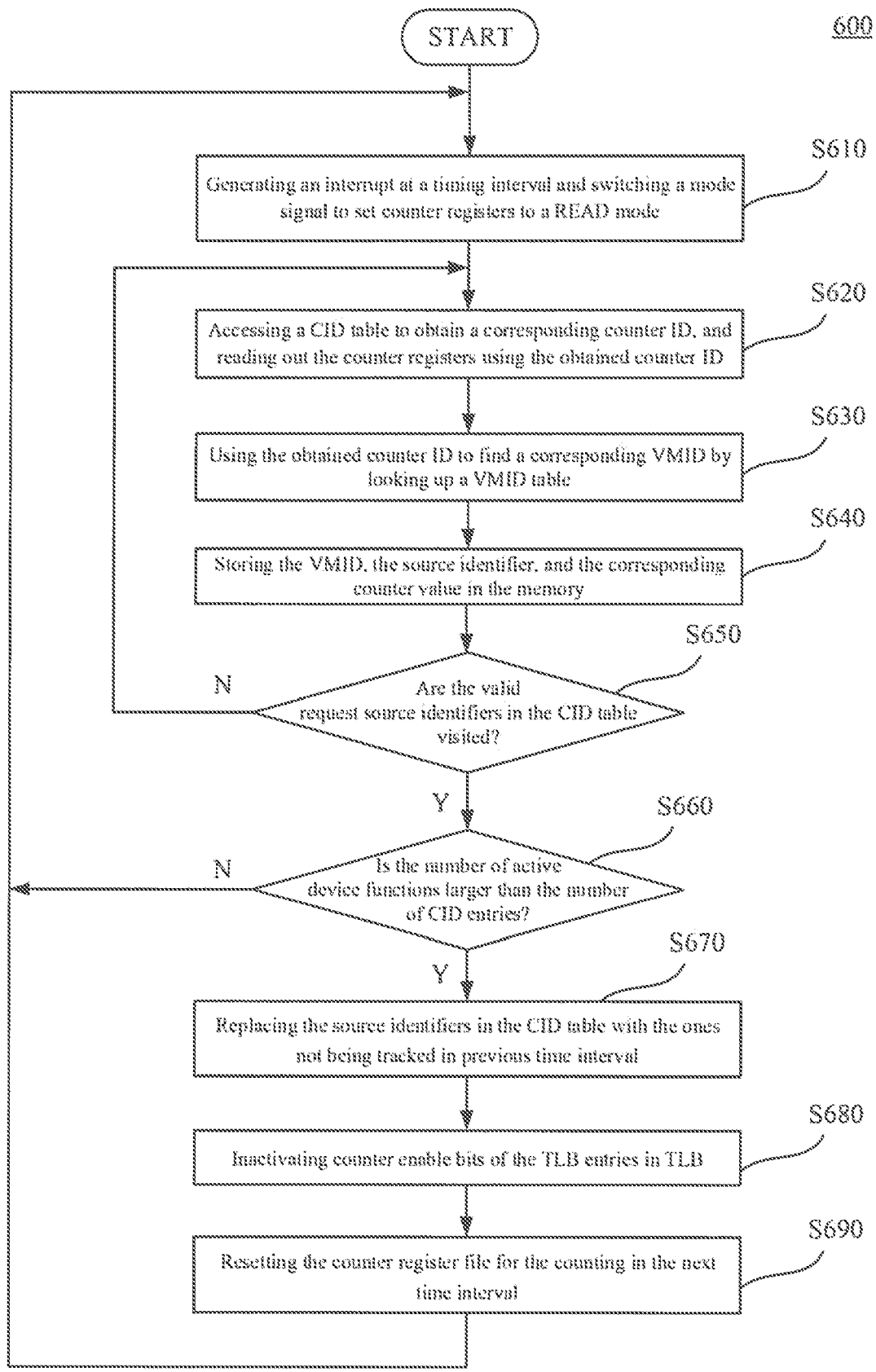
FIG. 6 illustrates a flow diagram of an exemplary method for reading out the information stored in the I/O register file, consistent with embodiments of the present disclosure.

Reference is made to FIG. 6, which illustrates a flow diagram of an exemplary method 600 for reading out the information stored in the I/O register file, consistent with embodiments of the present disclosure. Similarly, method 600 can also be performed by a computer system (e.g., system 200 in FIG. 2) which includes a processor, an I/O counter register file in an IOTLB and a memory storing a mapping table. In some embodiments, counter registers (e.g., counter registers C0-Cn in FIG. 3) in the I/O counter register file are exposed via PCIe Base Address Registers (BAR) as memory-mapped I/O registers. These registers can be integrated with the existing sampling-based Performance Counter Monitoring framework.

In step S610, a timer in the processor generates a non-maskable interrupt (NMI) at the timing interval programmed by a performance monitoring unit (PMU) of the processor. In the interrupt procedure handled by the VMM (e.g., VMM 140 in FIG. 1), the processor switches a mode signal (e.g., mode signal in FIG. 3) to set the counter registers C0-Cn to a READ mode.

Next, in step S620, the processor accesses the CID table (e.g., CID table 410 in FIG. 4) to find the corresponding counter ID and to read out the memory-mapped counter registers using this counter ID for each PCIe device and its virtual function by the VMM.

In step S630, the processor looks up the VMID table and finds the corresponding VMID associated with the counter ID by the VMM. Accordingly, in step S640, the processor stores the collected VMID, the source identifier, and the corresponding counter value in the memory (e.g., memory 210 in FIG. 2) by the VMM.

In step S650, the processor determines whether the valid request source identifiers in the CID table are visited by the VMM. Responsive to a determination that a non-visited valid request source identifier exists in the CID table, the processor repeats steps S620-S650 to read out the counter registers and to write the data in the memory until all valid request source identifiers are visited.

When the valid request source identifiers in the CID table are all visited, in step S660, the processor determines whether the number of the active device functions is larger than the number of entries in the CID table. For example, for a counter ID having 10-bit width, the processor checks whether there are more than 1024 active device functions to be tracked, since there are 1024 entries in the CID table for I/O traffic counting. Responsive to a negative determination indicating that the number of the active device functions is smaller than the number of entries in the CID table, steps S670-S690 for counter multiplexing are bypassed. Steps S610-660 will be repeated in the next time interval, until a given 110 monitoring period is terminated.

On the other hand, responsive to a positive determination at step S660, counter multiplexing is applied, and the processor further performs steps S670-S690 to reset the counter registers before repeating steps S610-S660 in next time interval. In step S670, the processor replaces the source identifiers in the CID table with the source identifiers that were not being tracked in the previous time interval by the VMM. In step S680, the processor inactivates the counter enable bits (e.g., EN bits) of the TLB entries by the VMM. Thus, in the next time interval, the I/O traffic accounting will not be carried out for the device functions that are already accounted. In step S690, the processor resets the counter register file by the VMM for the counting in the next time interval. Accordingly, any one of the counter registers in the counter register file can be used to track the I/O traffic of two or more different device functions in different time intervals, by assigning different source identifiers in the corresponding entry of the CID table.

Therefore, by the above operations in steps S610-S690, the values of the counter registers in the counter register file can be read out using memory read instructions. Thus, the per-VM I/O traffic results can be presented. By applying the counter multiplexing, in a system having a large number of I/O devices or virtual functions, the I/O traffic of the virtual functions can be counted and monitored with a relatively small number of entries in the CID table. Therefore, the width of the counter ID and the required amount of count registers can both be reduced, which provides efficiency in memory capacity requirement and flexibility in hardware designs.

In view of above, as proposed in various embodiments of the present disclosure, by applying the structure of IOTLB and device-TLB, and the CID table and VMID table stored in the memory, I/O traffic for VMs on PCIe devices can be respectively monitored even when the VMM is bypassed during normal I/O operations in directed I/O access, such as the pass-through or SR-IOV mode. The traffic results can be read out by VMM using instructions. Thus, cloud computing providers can monitor VMs' requirements on the bandwidth of I/O devices and manage virtual machines properly to keep the operating cost low.

The various example embodiments described herein are described in the general context of method steps or processes, which may be implemented in one aspect by a computer program product, embodied in a transitory or a non-transitory computer-readable medium, including computer-executable instructions, such as program code, executed by computers in networked environments. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A system for monitoring I/O traffic, comprising:
   a memory configured to store information;
   a device configured to send a request for accessing information from the memory; and
   a translation lookaside buffer (TLB) comprising:
      a counter register file comprising a plurality of counter registers; and
      a plurality of entries, having corresponding counter ID fields;
   wherein the TLB is configured to:
      receive a source identifier of the device and a virtual address associated with the request from the device,
      select an entry of the plurality of entries using the source identifier and the virtual address,
      select a counter register from the plurality of counter registers in accordance with information stored in the counter ID field of the selected entry, and
      update a value of the selected counter register in accordance with data transferred in association with the request.

2. The system for monitoring I/O traffic of claim 1, wherein the plurality of entries further have corresponding physical address fields, virtual address fields, source ID fields, and the TLB is configured to return a page frame number (PFN) stored in the physical address field of the selected entry for accessing the memory and transferring data between the device and the memory associated with the request.

3. The system for monitoring I/O traffic of claim 2, wherein the TLB is configured to select the entry if the source ID field and the virtual address field of the entry matches the source identifier and the virtual address.

4. The system for monitoring I/O traffic of claim 1, wherein the system is further configured to perform a page-table walk to obtain a page frame number (PFN) for accessing the memory in response to a determination that the request is unmatched to the plurality of entries.

5. The system for monitoring I/O traffic of claim 4, further comprising:
   a mapping table, comprising a plurality of mapping entries;
   wherein the TLB is configured to access the mapping table to select a mapping entry from the plurality of mapping entries in accordance with the request, and replace a physical address field and the counter ID field in one of the entries in the TLB with the PFN and information stored in the selected mapping entry respectively, in response to the determination that the request is unmatched to the plurality of entries.

6. The system for monitoring I/O traffic of claim 5, wherein the plurality of entries further have corresponding counter enable bits configured to indicate whether the corresponding counter register is enabled to count.

7. The system for monitoring I/O traffic of claim 6, wherein the system is configured to inactivate the counter enable bit of the selected entry if the source identifier in the request is unmatched to a source identifier field in the selected mapping entry.

8. The system for monitoring I/O traffic of claim 6, wherein the system is configured to activate the counter enable bit of the selected entry if a request source ID in the request is matched to a source identifier field in the selected mapping entry and a valid bit in the selected mapping entry is activated.

9. The system for monitoring I/O traffic of claim 5, wherein the system is further configured to call a virtual machine monitor to update the counter ID field in the selected mapping entry if the valid bit in the selected mapping entry is inactivated.

10. The system for monitoring I/O traffic of claim 5, wherein the mapping table comprises:
    a first table configured to store mapping information between a plurality of virtual machines and a plurality of counter IDs; and
    a second table configured to store mapping information between the plurality of counter IDs and a plurality of source identifiers.

11. The system for monitoring I/O traffic of claim 1, wherein a value stored in the selected counter register is increased by a size of data transferred between the device and the memory associated with the request in response to the counter enable bit of the selected entry being activated.

12. The system for monitoring I/O traffic of claim 11, wherein the plurality of counter registers have corresponding first sub-registers and second sub-registers, and values stored in the first sub-register of the selected counter register and the second sub-register of the selected counter register are respectively increased by the size of data sent to the memory from the device and by the size of data retrieved from the memory to the device.

13. The system for monitoring I/O traffic of claim 1, wherein the plurality of counter registers are memory mapped I/O registers configured to be read out using one or more memory instructions.

14. The system for monitoring I/O traffic of claim 1, wherein the TLB is in an input-output memory management unit that accesses the memory and that is separated from the device.

15. The system for monitoring I/O traffic of any one of claim 1, wherein the TLB is in the device.

16. A method for monitoring I/O traffic, comprising:
- receiving, from a device, a source identifier of the device and a virtual address associated with a request for accessing information from a memory;
- selecting an entry of a plurality of TLB entries in accordance with the source identifier and the virtual address;
- selecting a counter register from a plurality of counter registers in accordance with a counter ID stored in a counter ID field of the selected entry; and
- updating a value of the selected counter register in accordance with data transferred in association with the request.

17. The method for monitoring I/O traffic of claim 16, further comprising:
- responsive to a determination that the request is unmatched to the plurality of entries, performing a page-table walk to obtain a page frame number (PFN) for accessing the memory;
- accessing a mapping table to select a mapping entry from a plurality of mapping entries in accordance with the request; and
- replacing a physical address field and the counter ID field in one of the entries in the TLB with the PFN and information stored in the selected mapping entry respectively.

18. The method for monitoring I/O traffic of claim 17, further comprising:
- inactivating a counter enable bit of the selected entry in response to the source identifier in the request being unmatched to a source identifier field in the selected mapping entry;
- activating the counter enable bit of the target entry in response to the source identifier in the request being matched to the source identifier field in the selected mapping entry and a valid bit in the selected mapping entry being activated; and
- calling a virtual machine monitor to update the counter ID field in the selected mapping entry in response to the valid bit in the selected mapping entry being inactivated.

19. The method for monitoring I/O traffic of claim 16, wherein updating the value of the selected counter register comprising:
- responsive to a counter enable bit of the selected entry being activated, increasing the value stored in the selected counter register by size of data accessed in association with the request.

20. A system for monitoring I/O traffic, comprising:
- a memory configured to store information and a mapping table;
- a translation lookaside buffer (TLB) comprising:
  - a counter register file having a plurality of counter registers exposed as memory-mapped I/O registers, wherein a counter register of the plurality of counter registers is selected to update a value of the selected counter register in accordance with data transferred between the memory and a device; and
- a processor configured to:
  - set the plurality of counter registers to a read mode during an interrupt,
  - read out the plurality of counter registers using corresponding counter IDs obtained from the mapping table, and
  - store the values of the plurality of counter registers in the memory.

* * * * *